United States Patent
Keefover et al.

(10) Patent No.: US 8,803,388 B2
(45) Date of Patent: Aug. 12, 2014

(54) ACTUATOR ASSEMBLY USING A CAM SLOT BEARING DRIVE MECHANISM

(75) Inventors: Robert D. Keefover, Lake Orion, MI (US); Murray F. Busato, Clinton Township, MI (US)

(73) Assignee: BorgWarner, Inc., Auburn Hills, MI (US)

( * ) Notice: Subject to any disclaimer, the term of this patent is extended or adjusted under 35 U.S.C. 154(b) by 1319 days.

(21) Appl. No.: 12/085,001

(22) PCT Filed: Nov. 14, 2006

(86) PCT No.: PCT/US2006/044133
§ 371 (c)(1),
(2), (4) Date: May 14, 2008

(87) PCT Pub. No.: WO2007/059100
PCT Pub. Date: May 24, 2007

(65) Prior Publication Data
US 2009/0160275 A1    Jun. 25, 2009

Related U.S. Application Data

(60) Provisional application No. 60/736,490, filed on Nov. 14, 2005.

(51) Int. Cl.
*H02K 7/10* (2006.01)
*F16K 31/53* (2006.01)
*F16K 31/528* (2006.01)
*F16H 25/14* (2006.01)
*F16K 31/524* (2006.01)
*F16H 19/00* (2006.01)

(52) U.S. Cl.
CPC ............... *F16H 25/14* (2013.01); *F16K 31/53* (2013.01); *F16K 31/528* (2013.01); *F16K 31/52408* (2013.01); *F16H 19/001* (2013.01)
USPC .............................................. 310/83; 310/99

(58) Field of Classification Search
CPC ........ H02K 7/10; H02K 7/116; H02K 7/1163
USPC ............................................... 310/83, 99
See application file for complete search history.

(56) References Cited

U.S. PATENT DOCUMENTS 4,286,473 A * 9/1981 Dehan et al. .................... 74/107
4,300,807 A * 11/1981 Poubeau .......................... 310/90.5
(Continued)

FOREIGN PATENT DOCUMENTS

| | | |
|---|---|---|
| FR | 1 305 601 | 10/1962 |
| GB | 2 017 220 | 10/1979 |
| WO | WO 01/66984 | 9/2001 |

OTHER PUBLICATIONS

Definition of "on" from Dictionary.com Unabridged. Random House, Inc. Aug. 18, 2010. <Dictionary.com http://dictionary.reference.com/browse/on>.*

*Primary Examiner* — Michael Andrews
(74) *Attorney, Agent, or Firm* — Warn Partners, P.C.

(57) ABSTRACT

The present invention is directed to an actuator assembly (10) having an actuator device (26) operably associated with a housing (16), one or more rotating gear members (46, 48, 52) operably associated with the actuator device (26), a bearing member (76) operably associated with the one or more rotating gear members (46, 48, 52), and a cam (66) operably associated with the one or more rotating gear members (46, 48, 52), for translating rotary motion of the gear members (46, 48, 52) to axial motion. When the actuator 0 device (26) is actuated, the one or more rotating gear members (46, 48, 52) rotate, causing the bearing member (76) to move on the cam (66).

30 Claims, 6 Drawing Sheets

(56) References Cited

U.S. PATENT DOCUMENTS

| | | |
|---|---|---|
| 4,638,676 A | 1/1987 | Lively et al. |
| 5,551,406 A * | 9/1996 | Everingham et al. ......... 123/520 |
| 5,555,776 A * | 9/1996 | Gazza ............................ 74/567 |
| 2002/0040974 A1* | 4/2002 | Kamimura et al. ........... 137/554 |
| 2002/0134441 A1* | 9/2002 | Kusumoto et al. ......... 137/625.3 |

* cited by examiner

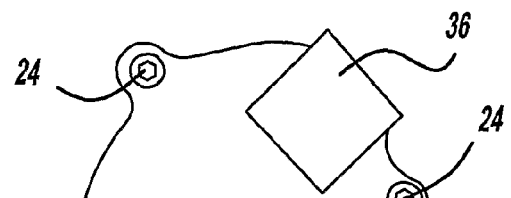
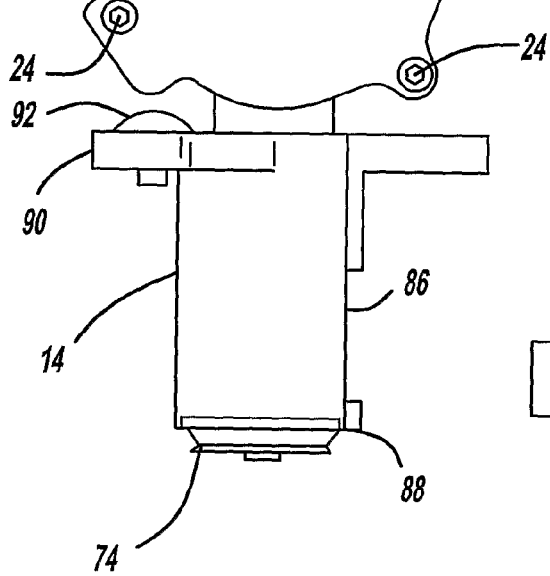
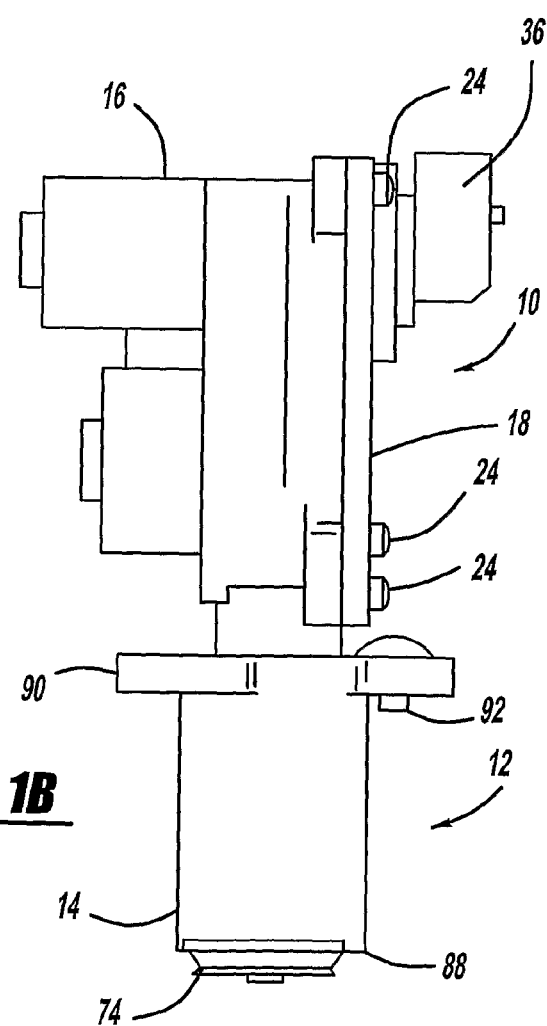

ACTUATOR ASSEMBLY USING A CAM SLOT BEARING DRIVE MECHANISM

CROSS-REFERENCE TO RELATED APPLICATIONS

This application is a National Stage of International Application No. PCT/US2006/044133, filed Nov. 14, 2006. This application claims priority to U.S. Provisional Application No. 60/736,490 filed on Nov. 14, 2005. The disclosures of the above applications are incorporated herein by reference.

FIELD OF THE INVENTION

The present invention relates to an actuator assembly for use in a vehicle. More particularly the present invention relates to an arrangement for converting rotary motion from an actuator to axial motion.

BACKGROUND OF THE INVENTION

Actuators are used to operate a number of devices such as fluid control valves or control mechanisms used on turbochargers. The actuators may have axial motion or they may have rotary motion that is converted to axial motion. Converting rotary-to-axial motion requires an arrangement that efficiently translates the motion. Often times such arrangements require an additional element or component that increases the complexity of the device. It is desirable to develop arrangements that eliminates complex or additional components as well as provide greater packaging advantages. Thus, the overall size, weight and cost of the device is reduced.

SUMMARY OF THE INVENTION

The present invention is directed to an actuator assembly having an actuator device operably associated with a housing, one or more rotating gear members operably associated with the actuator device, a bearing member operably associated with the one or more rotating gear members, and a cam operably associated with the one or more rotating gear members, for translating rotary motion of the gear members to axial motion.

When the actuator device is actuated, the one or more rotating gear members rotate, causing the bearing member to move on the cam.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1a is a front plan view of an actuator assembly, according to the present invention;

FIG. 1b is a side plan view of an actuator assembly, according to the present invention;

DETAILED DESCRIPTION OF THE PREFERRED EMBODIMENTS

Figure 2:
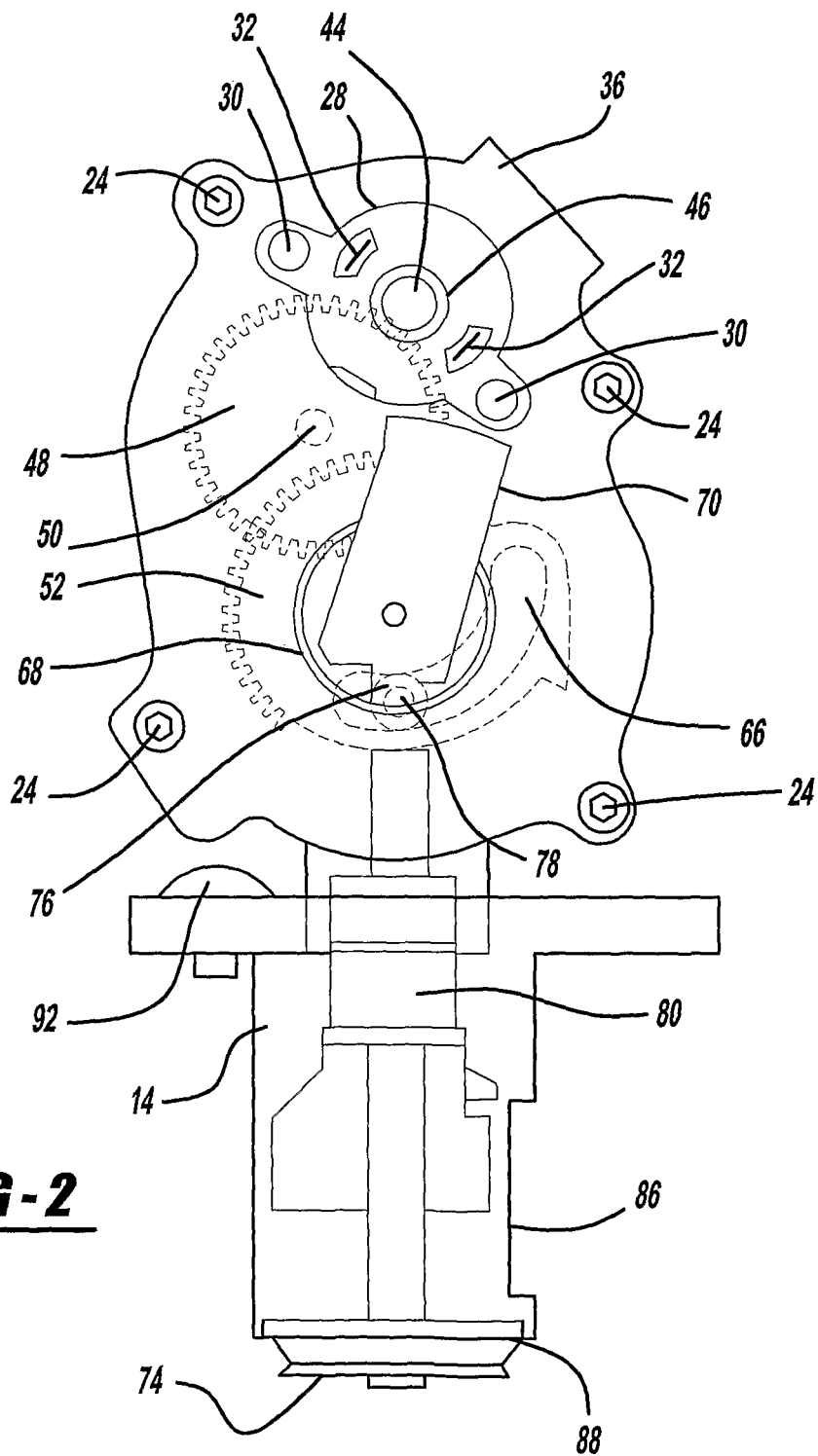
FIG. 2 is a sectional front plan view of an actuator assembly in a closed position, according to the present invention.
Figure 3:
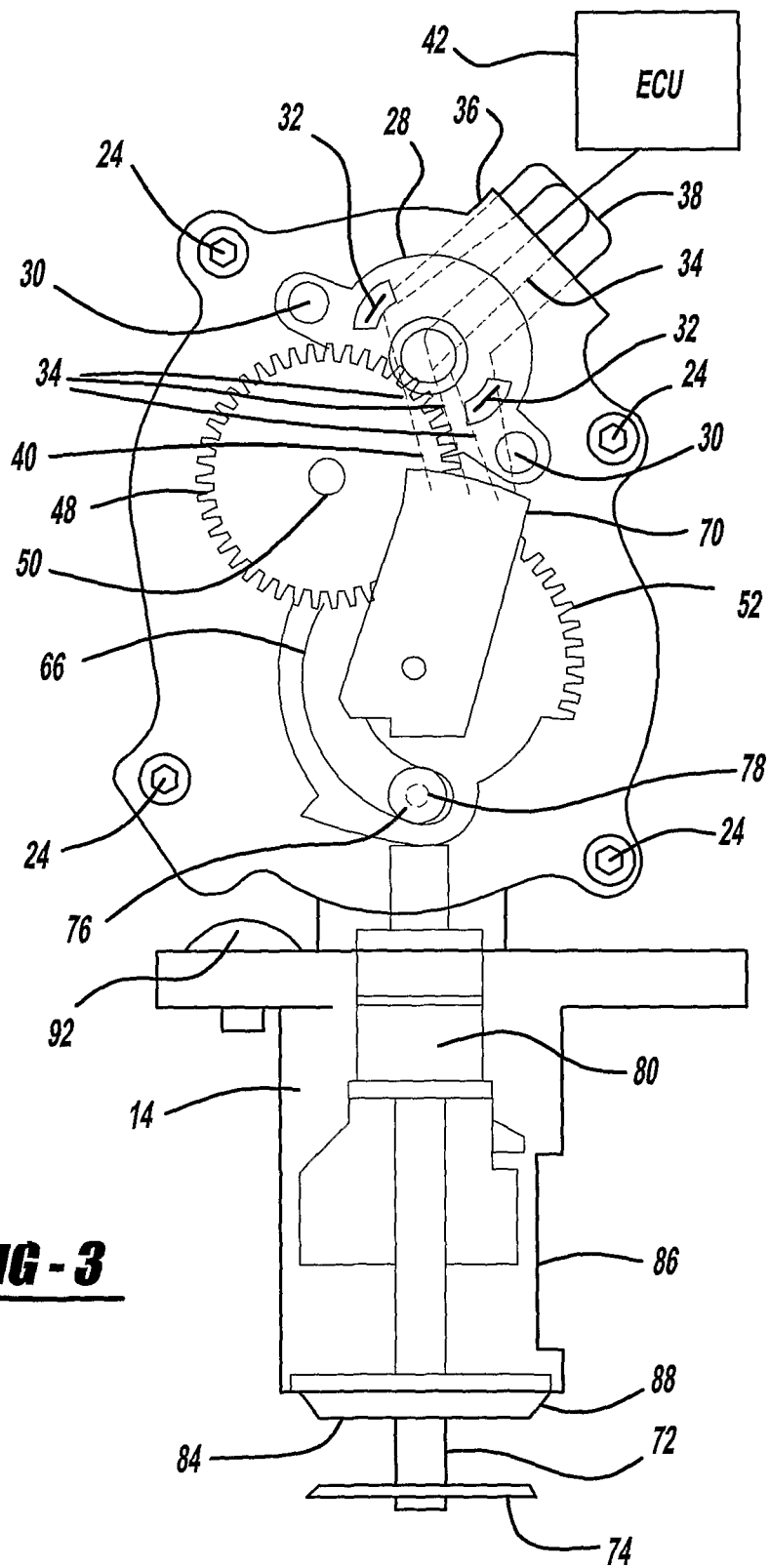
FIG. 3 is a second sectional front plan view of an actuator in an open position, according to the present invention.

The following description of the preferred embodiment(s) is merely exemplary in nature and is in no way intended to limit the invention, its application, or uses.

FIGS. 1a and 1b show the front and side views of an actuator assembly 10 which includes a valve assembly 12. Referring to FIGS. 1-4, actuator assembly 10 has a valve housing 14 and an actuator housing 16 designed to accept a connector/cover 18 with an integrated position sensor 20. An elastomer seal 22 is used to seal the connector/cover 18 to the actuator housing 16. Screws 24 secure the connector/cover 18 to the housing 16. An actuator device such as a DC motor 26 is secured by a bracket 28, and screws 30 to the actuator housing 16. The connector/cover 18 has an integrated leadframe 40 made of multiple electrical conductors 34. Terminals 32, of the motor 26, interconnect with the electrical conductors 34 of the electrical connector/cover 18. The connector/cover 18 has a connector 36 with terminals 38 that provide an external connection to a suitable electronic control unit (ECU) 42. The terminals 38 may also be a portion of the leadframe 40.

The rotating shaft 44 of the motor 26 is fitted with pinion gear 46 that engages with an intermediate gear 48. The intermediate gear 48 is located by pin 50 in actuator housing 16. The intermediate gear 48 engages output gear 52. The output gear 52 rotates about output gear shaft 54, which is located in the actuator housing 16. The shaft 54 is guided by a bearing member 56 and bushing 58 that are also located in actuator housing 16. The clip 60 secures the shaft 54 to the actuator housing 16. A cup plug 62 is used to cover the opening 64 in the actuator housing 16. A cam shown here in the form of a cam slot 66 is formed in output gear 52.

A sensor rotor 68 is attached to output gear 52 by a suitable method such as a plastic overmolding. Alternate fastening methods include ultrasonic welding, adhesives, or a "snap fit." The sensor rotor 68 is positioned relative to the associated position sensor 20 that is part of the sensing circuit 70 attached to the connector/cover 18. The position sensor 20 can be any type of sensor capable of detecting the position of the sensor rotor 68 and output gear 52. For example, one type of position sensor 20 is a non-contact position sensor, such as an induction sensor. Such a sensor can have an inductor overmolded onto the output gear 52. The electrical connections to the sensing circuit 70 are made through the leadframe 40, conductors 34, and terminals 38. The sensor rotor 68 couples a signal from a transmitter to a receiver on the position sensing circuit 70. The position sensing circuit 70 provides an output signal that is relative to the rotation and position of the output gear 52.

A stem member or valve stem 72 is fitted with a valve member or poppet valve 74 at one end and a bearing member or bearing 76 held by a pin 78 at the opposite end. The valve stem 72 is guided by a bushing 80 which is retained in valve housing 14 by suitable manner such as a press fit. Valve housing 14 has an inlet 84 and outlet 86. Inlet 84 is fitted with a valve seat 88 that will seat poppet valve 74 and block flow between the inlet 84 and outlet 86.

Figure 4:
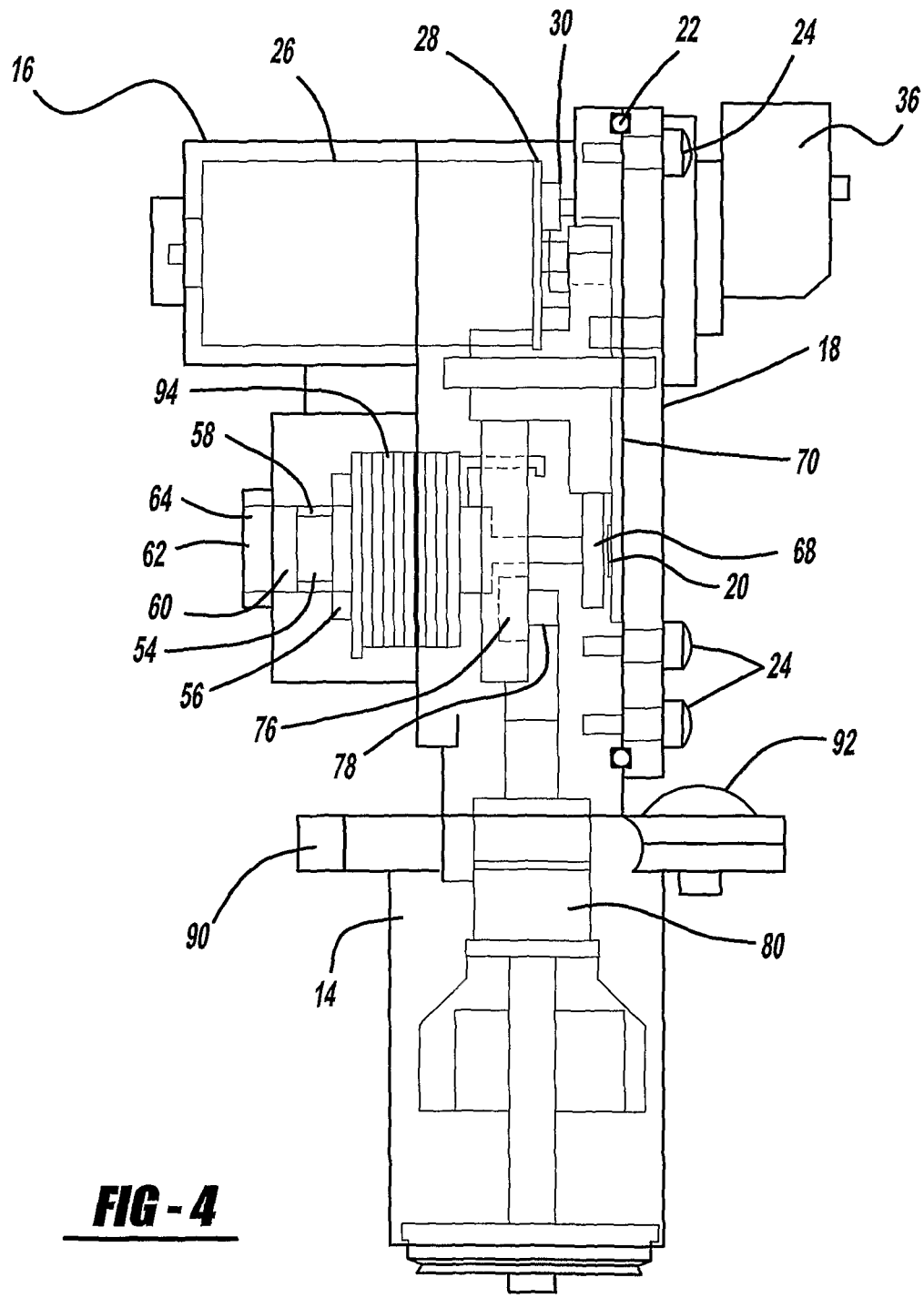
FIG. 4 is a sectional side plan view of an actuator assembly, according to the present invention.

The actuator housing 16 and valve housing 14 are shown as a single component. The actuator housing 16 and valve housing 14 can also be separated into two components. For example, the actuator housing 16 and valve housing 14 could be separated at the flange 90 and joined by a suitable means such as threaded fasteners 92 as shown in FIG. 4.

A spring 94 is coaxial with the output gear shaft 54. The spring 94 has features that engage the output gear 52 and the actuator housing 16. The spring 94 is designed to cause the output gear 52 to rotate in a counterclockwise direction. The cam slot 66, located in the output gear 52, is designed to receive the bearing 76 that is attached to one end of valve stem 72. The cam slot 66 is shaped to cause the bearing 76, valve stem 72, and poppet valve 74 to move in the direction of the valve seat 88 when the spring 94 applies the counterclockwise torque to the output gear 52. The torque of the spring 94 is sufficient to cause the poppet valve 74 to seat on valve seat 88 and block flow between the valve inlet 84 and outlet 86.

The actuator assembly 10 operates through the use of an engine control unit (ECU) 42 that provides a suitable electrical signal by way of terminals 38, leadframe 40, conductors 34, and motor terminals 32.

The motor 26 receives a signal from the ECU 42 and develops torque that is relative to the strength of the signal. The torque generated by the motor 26 will be transmitted through the pinion gear 46, and intermediate gear 48 to output gear 52. This torque will oppose the resistance of the spring 94. When the signal and the resulting torque is sufficient, it exceeds the resistance of the spring 94 and causes the output gear 52 to rotate. Progressively increasing the signal provides a higher resultant torque that increases the degree of the output gear 52 rotation. Decreasing the signal reduces the degree of output gear 52 rotation.

The cam slot 66, formed in output gear 52, engages with bearing 76 that is attached to valve stem 72 by pin 78. The rotation of output gear 52 and cam slot 66, forces the bearing 76, pin 78, valve stem 72, and poppet valve 74 to move in an axial direction that unseats the poppet valve 74 from valve seat 88 and allow flow between the inlet 84 and the outlet 86.

The contour of the cam slot 66 determines the rate of axial movement versus output gear 52 rotation. The contour of the cam slot 66 also, in part, determines the operating force acting on the bearing 76, valve stem 72, and poppet valve 74. The contour is varied through the rotation to provide a variable poppet valve 74 opening/flow rate through the axial stroke of the poppet valve 74 to provide the desired operating characteristics.

The contour of the cam slot 66 also controls the operating force, at a specific rotation/stroke. In one embodiment, the contour of the cam slot 66 is configured to provide a continuously variable rate through the rotation of the output gear 52. Controlling the mechanical advantage through rotation provides a method of matching the required force of the valve assembly 12 to the available torque of the motor 26. For example, in an alternate embodiment a higher force may be provided at a specific point through the rotation of output gear 52, by adjusting the contour of the cam slot 66. As the motor 26 rotates the pinion gear 46, intermediate gear 48, and output gear 52, the bearing 76 moves through the cam slot 66 changing the position of the valve stem 72 and poppet valve 74 relative to the output gear 52, thereby changing the amount of force transferred therebetween.

Sensing circuit 70 provides an output signal that is relative to the degree of output gear 52 rotation and axial poppet valve 74 movement. This output serves as an indication of relative flow through the poppet valve 74.

In another aspect, the electronic sensing circuit 70 may also be programmed to provide a specific signal range for a given valve stem 72 and poppet valve 74 position. For example, the poppet valve 74 in a closed position may be programmed within a specific sensing voltage range. It is believed that this capability improves the accuracy of valve stem 72 and poppet valve 74 position, as well as compensate for component and assembly variation. One way of achieving this is by accessing the sensing circuit 70 using a calibration procedure.

The position sensor 20 and the output signal of the position sensor 20 are part of a closed loop control system for the poppet valve 74. The ECU 42 is programmed with a map of engine operating conditions and a desired flow for each condition. The desired flow is translated to the sensing circuit 70 output signal and ECU 42 signal. The ECU 42 provides the signal to the motor 26 and cause the poppet valve 74 to move to a desired position. The ECU 42 adjusts the signal to achieve-or-maintain the desired poppet valve 74 position.

Figure 6:
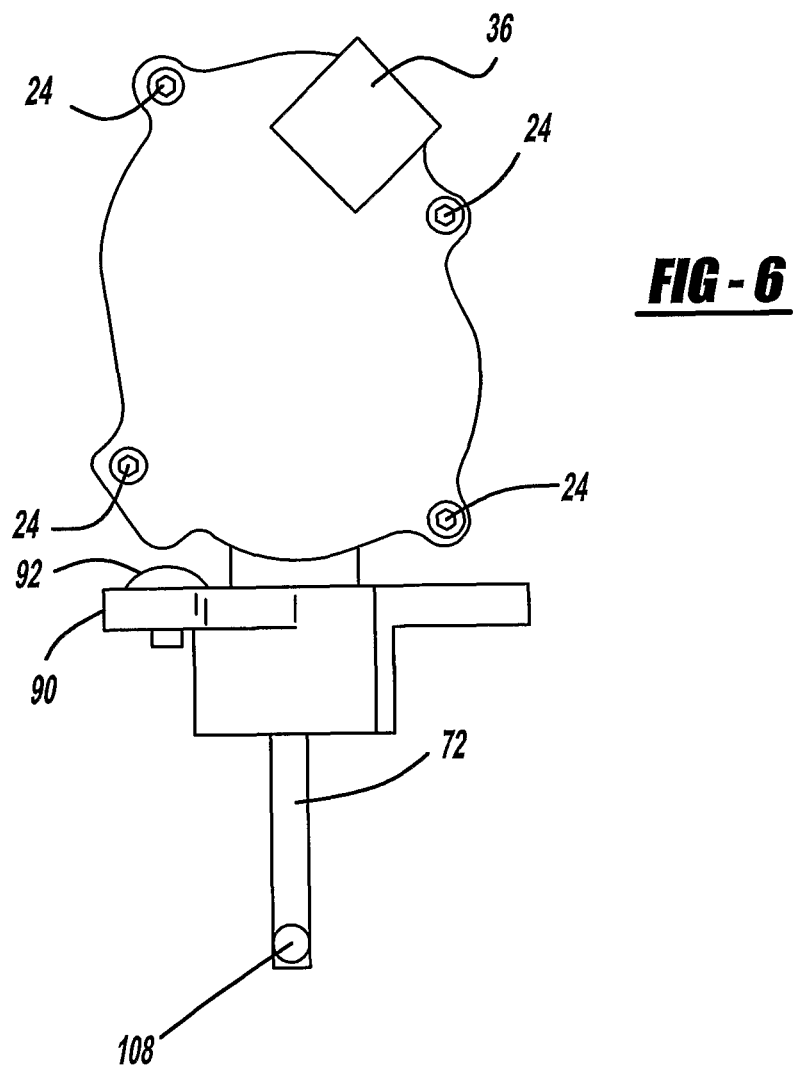
FIG. 6 is a front plan view of an actuator assembly with the poppet valve replaced with a pin and the valve housing removed, according to the present invention.

The use of the cam slot 66, integrated into the output gear 52, is an effective means of converting the rotary motion of the motor 26 to axial motion of the valve stem 72. It is to be appreciated that this concept is also applicable to other devices that require axial movement. For example, the valve housing 14 portion of the actuator assembly 10 could be removed to expose the valve stem 72. The valve stem 72 can be connected to any device that would require axial operation, such as the control device of a turbocharger as shown in FIG. 6. In FIG. 6, a portion the valve housing 14 has been removed to expose the valve stem 72, and the poppet valve 74 has been replaced with a pin 108.

The integration of the cam slot 66 is based upon the manufacturing process of the component. For example, in one embodiment, the cam slot 66 is molded by an injection molded process, however, the cam slot may also be cast if a metal casting process is used, or compacted if a powdered metal process is used. In other embodiments, the cam slot 66 is made as a separate part and attached by suitable means such as plastic overmolding, press fit, riveting, welding, brazing, or adhesive. Also, it is not necessary that the cam slot 66 be completely formed through the output gear 52. In an alternate embodiment, a wall that limits the movement of the bearing 76 and valve stem 72 is utilized to provide the cam guidance.

Figure 5A:
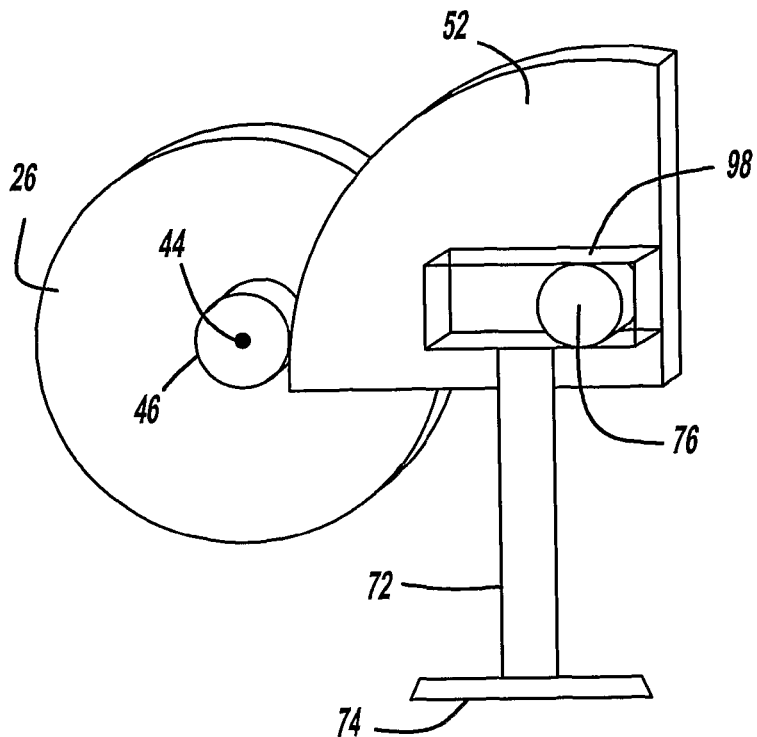
FIGS. 5A and 5B are isometric views of an alternate embodiment of the present invention.
Figure 5B:
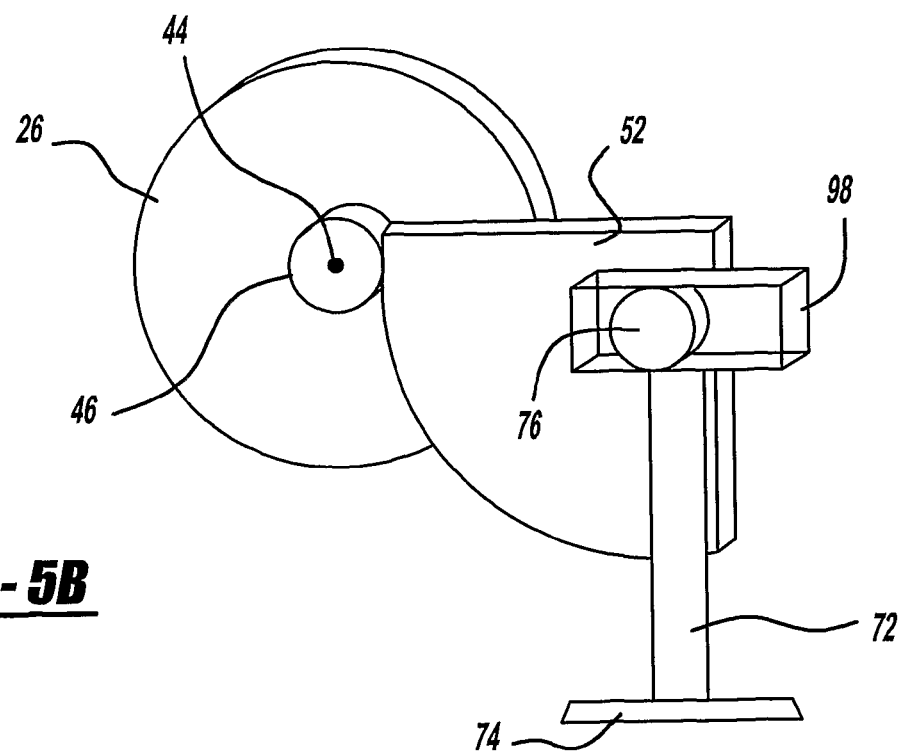

Variations of the invention may be used for translating the motion. Referring to FIGS. 5a and 5b, the bearing 76 is attached to the output gear 52 and is offset from the center of rotation of the output gear 52. A guide slot 98 is formed with or attached to the valve stem 72; the guide slot 98 is operably configured for receiving the bearing 76. The valve stem 72 will move in an axial motion as the output gear 52 is rotated in either a clockwise or counterclockwise motion. The rate of travel and the ratio of mechanical advantage are dependent upon the shape of the slot 98, position of the slot 98, and the position of the bearing 76. In this embodiment, the pinion gear 46 is directly in mesh with the output gear 52.

In the first position, shown in FIG. 5a, the bearing 76 it located at one end of the guide slot 98. As the output gear 52 rotates, the bearing 76 moves through the guide slot 98 and moves about the axis of the output gear 52. As the output gear 52 continues to rotate, the guide slot 98, valve stem 72 and poppet valve 74 arrive in the position shown in 5b. This embodiment is also not limited for use with a poppet valve 74, it is within the scope of the present invention to use the present invention in other devices that require rotary to axial motion.

The description of the invention is merely exemplary in nature and, thus, variations that do not depart from the gist of the invention are intended to be within the scope of the inven-

The invention claimed is:

1. An actuator assembly, comprising:
an actuator device operably associated with a housing;
one or more rotating gear members operably associated with said actuator device;
a bearing member operably associated with said one or more rotating gear members;
a cam slot formed on one of said one or more rotating gear members for translating rotary motion of said one or more rotating gear members to axial motion of the bearing member as said bearing member slides along said cam slot, wherein said cam slot is configured to have a contour that provides a continuously variable rate of axial movement of said bearing member through the rotation of said one or more rotating gear members; and
wherein when said actuator device is actuated, said one or more rotating gear members rotate, causing said bearing member to move on said cam.

2. The invention according to claim 1, wherein said cam slot is one selected from the group comprising an open slot, a closed slot, a raised surface, or a depressed surface.

3. The invention according to claim 1, further comprising:
an inlet and an outlet disposed within said housing;
a stem member connected to said bearing member, said stem member having a valve member;
a valve seat for selectably receiving said valve member; and
wherein when said valve member is received by said valve seat, said inlet will be closed off from said outlet, and when said bearing member moves on said cam, said valve member will no longer be received by said valve seat, allowing flow between said inlet and said outlet.

4. The invention according to claim 1, further comprising an integrated position sensor for detecting the position of either of said one or more rotating gear members and said bearing member.

5. The invention according to claim 4, wherein said integrated position sensor is selected from the group comprising an induction sensor, a magneto resistive sensor, a hall effect sensor, and a resistive sensor.

6. The invention according to claim 1, wherein the cam slot is located in the rotating member.

7. The invention according to claim 1, wherein the bearing member is located in either the rotating member or non-rotating member.

8. The invention according to claim 1, wherein the bearing member is selected from the group consisting of a pin, a pin bearing, a needle bearing, a ball bearing, a bushing, a sleeve over a pin, and combinations thereof.

9. The invention according to claim 1, wherein the actuator shares a common housing with the valve assembly.

10. The actuator assembly of claim 1, wherein said actuator device is a linear-type actuator, or a rotary type actuator.

11. The actuator assembly of claim 1 further comprising:
a stem member connected to said bearing member;
an inlet and an outlet of said valve disposed in said actuator housing;
a valve member connected to said stem member, said valve member disposed between said inlet and said outlet.

12. The actuator assembly of claim 11, wherein said bearing member is connected to said one or more rotating gear members, and said cam slot is integrally formed with said stem member.

13. The actuator assembly of claim 11, further comprising an integrated position sensor for detecting the position of either or both of said one or more rotating gear members and said bearing member.

14. The actuator assembly of claim 13, wherein said integrated position sensor is selected from the group comprising a magneto resistive sensor, a hall effect sensor, and a resistive sensor.

15. The actuator assembly of claim 13, wherein said integrated position sensor is an induction sensor.

16. The actuator assembly of claim 15, wherein said induction sensor has an inductor connected to one of said one or more rotating gear members and a sensor operably mounted near said inductor.

17. The actuator assembly of claim 11, further comprising a valve seat for selectably receiving said valve member, wherein when said valve member is received by said valve seat, flow between said inlet and said outlet is blocked, and when said valve member is moved by said stem member, flow is allowed between said inlet and said outlet.

18. The actuator assembly of claim 11, wherein said actuator device is used for controlling a valve or a turbocharger control device.

19. The actuator assembly of claim 11, wherein the shape of said cam slot and said bearing member create a mechanical advantage.

20. The actuator assembly of claim 11, wherein said cam slot increases or decreases the amount of force applied to said bearing member at a point through the rotation of said at least one rotating gear member, said increase or decrease in force dependent upon the shape of said cam slot.

21. The actuator assembly of claim 11, wherein said at least one rotating gear member is operably connected to a shaft, said shaft being operably supported by said housing.

22. The actuator assembly of claim 11, further comprising a spring which circumscribes said shaft and is engaged with said housing and said at least one rotating gear member mounted on said shaft, said spring is configured to provide resistance against rotation of said actuator device, and operates to hold said at least one rotating gear member mounted on said shaft in a stationary position.

23. The actuator assembly of claim 11, wherein said bearing member is selected from the group comprising a ball bearing, a bushing, a pin, a needle bearing, or sleeve over a pin.

24. An actuator assembly for converting rotary to linear motion, comprising:
a housing for supporting a shaft and connected to said shaft by a spring, said housing having an inlet and an outlet;
at least one rotating gear member having either a cam slot or a bearing member, said at least one rotating gear member supported by said shaft and connected to said spring;
a valve stem having either a cam slot or a bearing member;
a valve connected to said valve stem on the opposite end as either of said cam slot or said bearing;
a valve seat fitted to said inlet, said valve seat for selectably receiving said valve;
an actuator device operably associated with said at least one rotating gear member; and
wherein when said at least one rotating gear member has said cam slot, said stem member will have said bearing member with said bearing member received by said cam slot, and when said at least one rotating gear member has said bearing member, said stem member will have said cam slot with said bearing member received by said cam slot, and said spring biases said valve to be received by said valve seat, and when said valve is received by said valve seat, flow between said inlet and said outlet is blocked, and said bearing and said cam slot create a variable mechanical advantage such that when said actuator rotates said one or more rotating gear members to overcome the resistance of said spring, said bearing will move in said cam slot, causing said valve stem to move said valve away from said valve seat in a linear manner, allowing flow between said inlet and said outlet.

25. The actuator assembly for converting rotary to linear motion of claim 24, wherein said variable mechanical advantage is defined by the shape of said cam slot.

26. The actuator assembly for converting rotary to linear motion of claim 24, wherein said bearing member is mounted on said at least one rotating gear member, and said cam slot is integrated with said stem member such that when said bearing member moves in said cam slot, said stem member will move in a linear manner.

27. The actuator assembly for converting rotary to linear motion of claim 24, wherein said cam slot is integrated with said at least one rotating gear member, and bearing member is mounted on said stem member such that when said bearing member moves in said cam slot, said stem member will move in a linear manner.

28. The actuator assembly for converting rotary to linear motion of claim 24, further comprising a position sensor for detecting the position of either or both of said at least one rotating gear member and said bearing member.

29. The actuator assembly for converting rotary to linear motion of claim 28, wherein said position sensor is an induction sensor.

30. The actuator assembly for converting rotary to linear motion of claim 29, wherein said induction sensor has an inductor connected to said at least one rotating gear member and a sensor operably mounted near said inductor.

* * * * *